United States Patent [19]
Bryerton et al.

[11] 3,901,025

[45] Aug. 26, 1975

[54] AIRCRAFT ENGINE FUEL SYSTEM

[75] Inventors: John Bryerton, Flemington; Elliot C. Nichols, Mill Hall, both of Pa.

[73] Assignee: Piper Aircraft Corporation, Lock Haven, Pa.

[22] Filed: Feb. 1, 1974

[21] Appl. No.: 438,793

[52] U.S. Cl. .......................................... 60/39.09 F
[51] Int. Cl.[2] ................................... F02C 3/24
[58] Field of Search ............ 60/39.09 R, 39.09 F; 261/DIG. 55, DIG. 21

[56] References Cited
UNITED STATES PATENTS

| | | | |
|---|---|---|---|
| 2,438,245 | 3/1948 | Gregg | 60/39.09 F |
| 2,543,366 | 2/1951 | Haworth et al. | 60/39.09 F |
| 3,032,987 | 5/1962 | Taylor | 60/39.09 F |
| 3,774,394 | 11/1973 | Criffield | 60/39.09 R |
| 3,808,796 | 5/1974 | Spears | 60/39.09 F |
| 3,841,089 | 10/1974 | Clark | 60/39.09 F |

FOREIGN PATENTS OR APPLICATIONS

| | | | |
|---|---|---|---|
| 1,077,291 | 7/1967 | United Kingdom | 60/39.09 F |

*Primary Examiner*—C. J. Husar
*Assistant Examiner*—Robert E. Garrett
*Attorney, Agent, or Firm*—Patrick J. Walsh

[57] ABSTRACT

The fuel system includes a fuel tank, a fuel pump for pumping fuel through a control unit and a start control unit to the nozzles of the aircraft engine, a reservoir, a conduit for draining fuel from the engine nozzles into the reservoir after the engine shut-down, and a jet pump for pumping the drained fuel from the reservoir to the fuel tank in response to engine start-up. The jet pump includes an aspirator having a nozzle supplied with fuel under pressure from the fuel supply system. A solenoid-actuated valve is disposed in the fuel conduit feeding the nozzle and is actuated in response to operation of the engine starter switch. In use, fuel from the nozzles is drained into the reservoir after engine shutdown. When the starter switch is closed to start the engine, the solenoid-actuated valve opens to supply high velocity fuel to the jet pump thereby to aspirate the fuel in the reservoir for delivery to the fuel tank. When the starter switch is turned off, the valve returns to its normally closed condition preventing further fuel discharge and operation of the jet pump. A check valve is installed in the conduit communicating between the reservoir and the fuel tank to prevent reverse flow of fuel into the reservoir and jet pump.

7 Claims, 4 Drawing Figures

AIRCRAFT ENGINE FUEL SYSTEM

In most turbine engines, a fuel pump supplies fuel to the engine through a fuel control unit and a start flow control unit. When the engine is shut down, fuel remains in the conduits between the start flow control unit and the fuel nozzle. This fuel is usually drained to the atmosphere to prevent raw fuel from entering the hot combustion chamber after shutdown and causing severe smoking from the exhaust. The fuel drained to the atmosphere is not only wasted but, additionally, pollutes the surrounding environment. Thus, it is desirable to provide a system for draining the fuel from the nozzles of the engine after shutdown without contaminating or polluting the surrounding environment. In fact, this has become necessary in view of legislation which has been passed prohibiting the jettisoning of raw fuel into the atmosphere. While various devices have been proposed to solve this problem, all, to applicant's knowledge, have provided complex systems lacking in simplicity and reliability and which systems are characterized by costly and heavy components and are therefore undesirable.

The present invention provides an aircraft fuel system which minimizes and/or eliminates many of the problems associated with prior proposals to eliminate the practice of draining raw fuel to the atmosphere upon engine shutdown and provides a novel and improved aircraft fuel system for draining fuel from the nozzles of the aircraft engine after engine shutdown and returning the drained fuel to the aircraft fuel system and which novel and immproved system has various advantages in construction, mode of operation and use in comparison with such prior proposals. Generally, the novel and improved aircraft fuel system hereof includes a reservoir for collecting the fuel which is conventionally drained to the atmosphere upon engine shutdown and a jet pump for returning the drained fuel to the aircraft's fuel system, for example to its fuel tank, when the engine is started. Particularly, in a fuel system for an aircraft engine characterized by a fuel tank, a fuel pump, a fuel control unit and a start flow control unit for delivering fuel to the nozzles of the aircraft engine, the present invention provides a reservoir in communication with the start flow control unit for receiving fuel drained from the fuel line coupled between the start flow control unit and the engine nozzles. Accordingly, upon engine shutdown, this fuel is drained into the reservoir and collected rather than jettisoned to the atmosphere as is the case in prior aircraft fuel systems. The present invention also provides a jet pump for pumping the drained fuel from the reservoir back into the fuel system, for example directly back to the fuel tank. A feature of the present invention resides in the fact that the jet pump comprises an aspirator whereby electrical or moving mechanical parts are not required for its operation. Also, the jet pump utilizes the fuel supplied to the nozzles by the fuel pump as the prime mover for the aspirator. A further feature hereof resides in the provision of an electrically actuated valve coupled to the starter switch for the engine whereby the pump is operable in response to closing the starter switch and hence to engine start-up to pump the drained fuel from the reservoir back into the aircraft's fuel system, i.e., into the aircraft's fuel tank.

More particularly, the pump is comprised of an aspirator located within the reservoir. The aspirator includes a primary nozzle in communication, through the electrically actuated valve, with the fuel line connecting the fuel pump and the engine nozzles. When the starter switch is closed, the valve opens to supply fuel at high velocity through the primary nozzle of the aspirator. The drained fuel in the reservoir is thus suctioned into the pump passage for return to the aircraft's fuel tank. When the starter switch is opened after engine start-up, the solenoid-actuated valve returns to its normally closed position preventing further fuel discharge through the jet pump while the engine is running. A check valve is disposed in the fuel line between the reservoir and the fuel tank to prevent reverse flow of fuel from the fuel tank to the pump and/or reservoir.

Accordingly, it is a primary object of the present invention to eliminate the necessity heretofore in aircraft fuel systems for jettisoning raw fuel to the atmosphere upon engine shutdown and to provide a novel and improved aircraft fuel system for draining fuel from the nozzles on the aircraft engine after engine shutdown and returning the drained fuel to the aircraft fuel system.

It is another object of the present invention to provide a novel and improved aircraft fuel system for draining fuel from the engine nozzles for collection in a reservoir and returning such drained fuel to the aircraft fuel system without electrically or mechanically actuated pumps.

It is still another object of the present invention to provide a novel and improved aircraft fuel system having the foregoing characteristics and further characterized by a jet pump and reservoir for aspirating the drained fuel from the reservoir back to the aircraft fuel tank and which component parts can be provided at minimum cost.

It is a related object of the present invention to provide a novel and improved aircraft fuel system having the foregoing characteristics and which is readily and easily adapted without substantial modification to existing engines.

It is a further object of the present invention to provide a novel and improved aircraft fuel system having the foregoing characteristics in which the jet pump utilizes high velocity fuel from the fuel feedlines as the prime mover for the pump.

It is a still further object of the present invention to provide a novel and improved aircraft fuel system having the foregoing characteristics wherein the jet pump operates to pump fuel drained from the engine's nozzles to the aircraft's fuel tank in response to the engine startup.

These and further objects and advantages of the present invention will become more apparent upon reference to the following specification, appended claims and drawings wherein:

Figure 1:
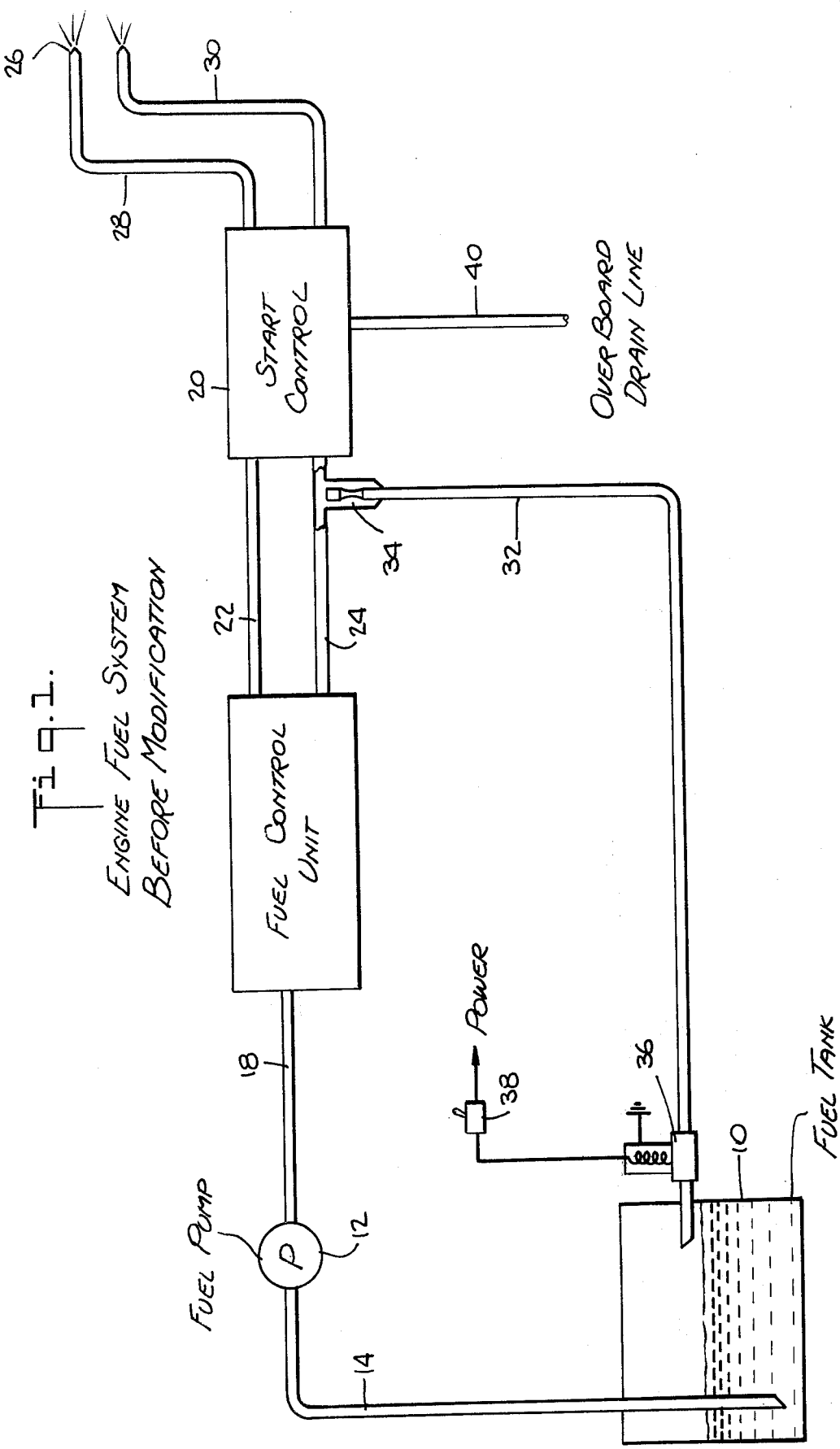
FIG. 1 is a schematic illustration of a conventional fuel system for an aircraft engine.

Referring now to FIG. 1, there is schematically illustrated a conventional aircraft engine fuel system comprised of a fuel tank 10, a fuel pump 12 for pumping fuel from tank 10 via a fuel line 14, a fuel control unit 16 connected with pump 12 via a fuel line 18, a start flow control unit 20 connected to fuel control unit 16 via fuel lines 22 and 24, and a pair of engine nozzles 26 connected with start flow control unit 20 via fuel lines 28 and 30. A bleed line 32 connects at one end through an orifice 34 to line 24 and at its opposite end to fuel tank 10. A solenoid-actuated valve 36 is provided in line 32, the solenoid of valve 36 being actuated in response to closing the engine starter switch 38. In operation, the starter switch 38 is closed to start the engine. Closing the starter switch opens normally closed valve 36 for bleeding fuel from the start flow control unit 20 to the fuel tank. Fuel is also pumped by a pump 12 through lines 14 and 18 and through the fuel control unit which meters the fuel supplied through the start control unit 20 to nozzles 26 in accordance with various parameters of the engine and the desired engine speed. The start flow control unit 20 generally comprises a ported sliding plunger in a ported housing, the plunger being movable through a rack and pinion arrangement. The start flow control unit 20 serves to improve the starting characteristics of the engine and has various functions including the maintenance of a minimum pressure in the main fuel control unit to ensure proper operation of the metering system and to sequence the supply of fuel to the manifolds, not shown, supplying fuel to the nozzles via lines 28 and 30. The start flow control unit has no effect on the fuel metered to the engine after engine start-up. When the engine is shut down, fuel is drained from nozzles 26 through lines 28 and 30 and start control unit 20 and conventionally vented to the atmosphere via an overboard vent line 40. The fuel drained through fuel line 40 is thus conventionally jettisoned after engine shutdown. The present invention provides apparatus for collecting the fuel drained from the engine nozzles and their associated fuel lines after engine shutdown and returning the drained fuel to the engine fuel system and particularly to the fuel tank.

Figure 2:
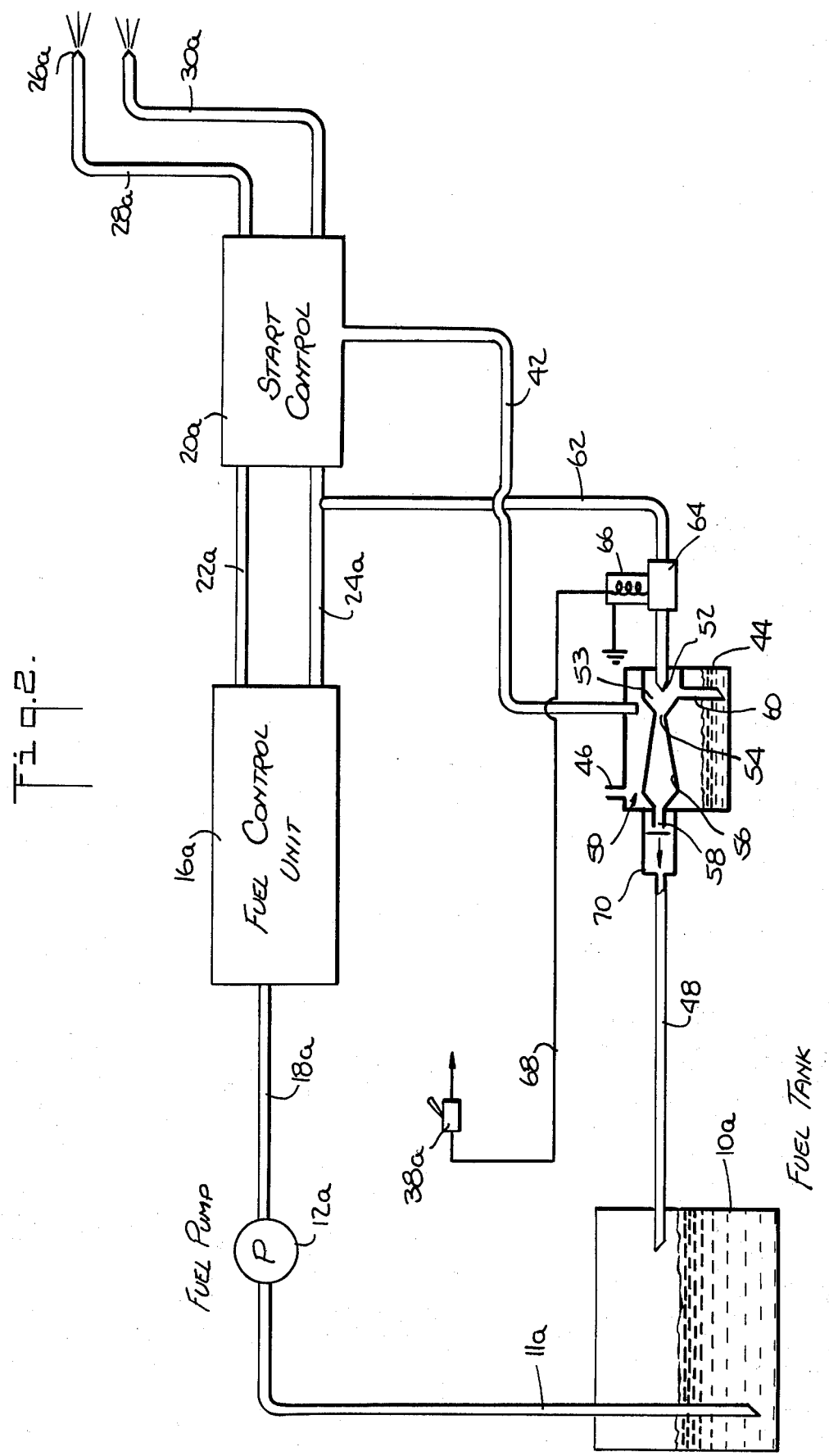
FIG. 2 is a schematic illustration of an aircraft fuel system constructed in accordance with the present invention.

This is accomplished in a manner which will now be described. Referring now to FIG. 2, there is illustrated an aircraft fuel system, generally of the type illustrated in FIG. 1, but modified to incorporate the apparatus for collecting the fuel drained from the engine nozzles and returning such fuel to the engine fuel system in accordance with the present invention. The parts of the aircraft fuel system of the present invention illustrated in FIG. 2 like the parts of the aircraft fuel system illustrated in FIG. 1 are denoted by like reference numerals with the letter *a* succeeding the reference numeral. Thus and referring to FIG. 2, fuel from fuel tank 10a is pumped through lines 14a and 18a by fuel pump 12a and through the fuel control and start flow units 16a and 20a, respectively for delivery to nozzles 26a via conduits 28a and 30a. Upon engine shutdown, fuel from nozzles 26a is drained therefrom and from lines 28a and 30a and flows through the start flow control unit 20a through a line 42 for delivery to a fuel reservoir 44. Reservoir 44 provides a generally cylindrical chamber for receiving and storing the drained fuel and thus avoids the necessity of venting such fuel to the atmosphere in accordance with previous conventional practice. The chamber 44 also includes an overboard vent 46.

Figure 3:
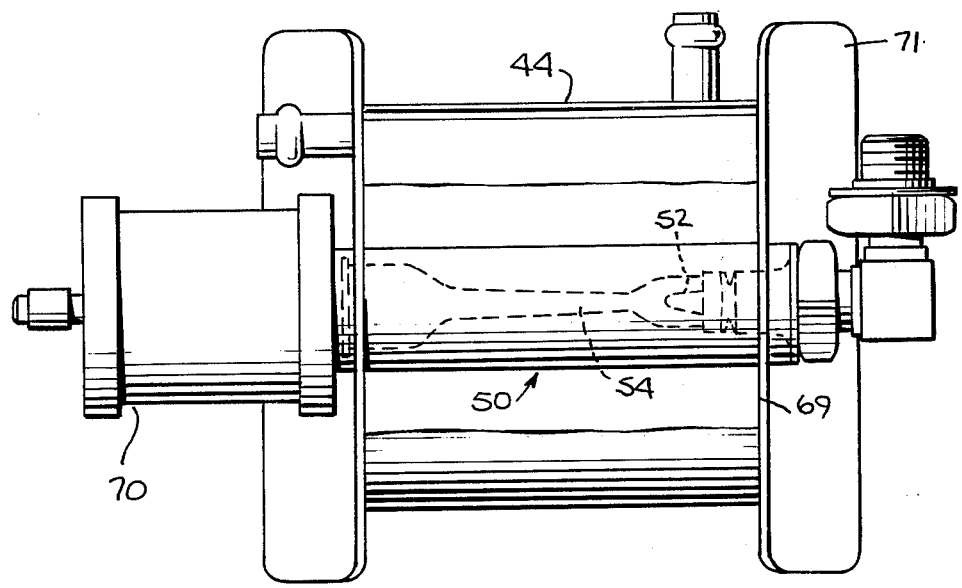
FIG. 3 is an enlarged side elevational view of a jet pump and reservoir and which components form a part of the fuel system hereof.
Figure 4:
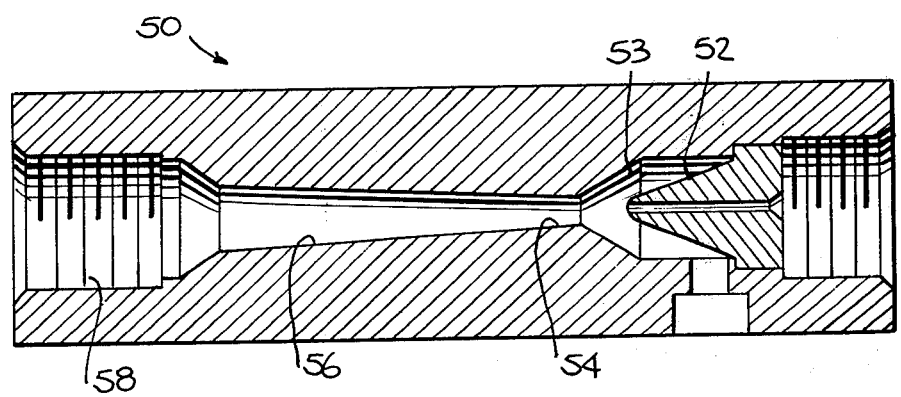
FIG. 4 is an enlarged cross sectional view of the jet pump.

In order to pump the drained fuel from the reservoir 44 for return to the fuel system and particularly for return to fuel tank 10a via line 48, there is, provided, preferably concentrically within reservoir 44, a jet pump generally designated 50. Jet pump 50 is of a type known as an aspirator and includes a housing or block 51 (FIG. 4) having a primary nozzle 52, a suction chamber 53, a venturi nozzle 54 having an outlet cone 56, and an outlet 58. The pump also includes an inlet line 60 (FIG. 2) in communication with the bottom of reservoir 44 for admitting drained fuel collected in the reservoir into the suction chamber 53. Nozzle 52 supplies purged fuel at high velocity through the suction chamber and venturi nozzle from a line 62 communicating with conduit 24a. A normally closed, solenoid-actuated, valve 64 is located in conduit 62. The solenoid 66 of valve 64 is electrically coupled to start switch 28a via an electrical line 68. Cylindrical reservoir 44 is closed at opposite ends by brackets or ears 69 (FIG. 3) having flanges 71 for securing the reservoir 44 and pump 50 to the side of the engine.

In a preferred embodiment of the present invention, the reservoir 44 is comprised of a circular chamber having a 2.5 inch diameter and a length approximately 2.5 inches. Jet pump 50 is preferably formed of aluminum bar stock having a diameter of 0.75 inch and a length approximately 2.8 inches long. The pump 50 is disposed coaxially within the cylindrical chamber 44. The interior of pump 50 is machined to the required surface configuration as indicated to provide the aspirating action.

In use, and after engine shutdown, fuel is drained from nozzles 26a via lines 28a and 30a, start control unit 20a and line 42 into reservoir 44. The drained fuel is retained in reservoir 44 until the engine is started. Thus, when starter switch 38a is closed to start the engine, it also actuates solenoid 66 to open normally closed valve 64. Fuel flows from the fuel control unit via lines 24a and 62 through the pump nozzle 52, the venturi nozzle 54 and the pump outlet cone 56 to outlet 58. This high velocity flow of fuel through nozzle 52 creates a suction in chamber 53 and aspirates the drained fuel in reservoir 44 through line 60 into suction chamber 53 for entrainment therewith and delivery to the pump outlet 58. At the pump outlet, there is provided a check valve 70 which permits flow of the drained fuel and the primary flow of fuel through line 48 into fuel tank 10a. Check valve 70, however, prevents reverse flow of fuel from fuel tank 10a to the jet pump and reservoir. Once the engine is started, start switch 38a is closed and solenoid 66 is deactuated whereby valve 54 is returned to its normally closed position. Accordingly, jet pump 50 is operated only during start-up of the engine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. An apparatus for draining fuel from the nozzles of an aircraft engine to a reservoir after enging shutdown and for returning the drained fuel to a fuel supply tank upon the next subsequent engine startup comprising: a fuel supply tank, means for supplying fuel under pressure from the tank to the nozzles of the aircraft's engine, a fuel receiving reservoir, a first pipeline for draining fuel from the engine nozzles to the reservoir during engine shutdown, a second pipeline defining a fluid conduit between the reservoir and the fuel supply tank, a jet pump for delivering drained fuel from the reservoir to the fuel supply tank through the second pipeline, a third pipeline communicating with the fuel supplying means for supplying purged fuel under pressure to said jet pump for delivering the drained fuel into the fuel tank, a normally-closed, solenoid actuated valve located in said third pipeline, a switch for starting the engine, means operatively coupling said starting switch to said valve for opening the valve upon engine starting to supply fuel under pressure to operate the jet pump and to drain fuel in the reservoir to the fuel supply tank.

2. Apparatus according to claim 1 including means responsive to the completion of egine startup for deactivating said jet pump means.

3. Apparatus according to claim 1 wherein said pump means includes an aspirator for suctioning the drained fuel from said reservoir for return to the fuel system.

4. Apparatus according to claim 3 wherein said aspirator includes a nozzle in communication with said fuel supply means for delivering fuel therefrom through said nozzle and thereby suctioning the drained fuel from said reservoir for return to said fuel supply means.

5. Apparatus according to claim 1 wherein said pump means includes a passage, a nozzle in communication with said fuel supply system for delivery of fuel under pressure through said pump passage, and means providing communication between said pump passage and said reservoir for suctioning the drained fuel from said reservoir for delivery through said passage to said fuel supply means.

6. Apparatus according to claim 1 including a check valve carried by the means communicating between said reservoir and said fuel supply means for preventing backflow of fuel from said fuel supply means to said reservoir.

7. Apparatus according to claim 1 wherein said jet pump means includes an aspirator having a primary nozzle, a suction chamber, and a venturi nozzle, said reservoir comprising a housing defining a substantially closed chamber, said pump being located substantially entirely within said chamber, and means in communication with said fuel supply means for delivering fuel through said nozzle and thereby suctioning the fuel in said reservoir for delivery through said suction chamber and venturi nozzle to said fuel supply means.

* * * * *